(12) United States Patent
Anderson et al.

(10) Patent No.: US 6,516,372 B1
(45) Date of Patent: Feb. 4, 2003

(54) PARTITIONING A DISTRIBUTED SHARED MEMORY MULTIPROCESSOR COMPUTER TO FACILITATE SELECTIVE HARDWARE MAINTENANCE

(75) Inventors: Russell Jay Anderson, Lakeville, MN (US); Martin M. Deneroff, Palo Alto, CA (US); Stephen Whitney, Sunnyvale, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/407,426

(22) Filed: Sep. 29, 1999

(51) Int. Cl.[7] .............................................. G06F 13/00
(52) U.S. Cl. ....................................................... 710/300
(58) Field of Search ................................ 709/213–216; 710/300, 301, 302; 711/148, 173; 712/13

(56) References Cited

U.S. PATENT DOCUMENTS

| | | | | |
|---|---|---|---|---|
| 5,555,487 A | * | 9/1996 | Katoh et al. ................. 361/680 |
| 6,105,089 A | * | 8/2000 | Chari et al. ................... 710/18 |
| 6,178,520 B1 | * | 1/2001 | DeKoning et al. .......... 711/114 |
| 6,247,079 B1 | * | 6/2001 | Papa et al. ................... 710/302 |
| 6,332,180 B1 | * | 12/2001 | Kauffman et al. .......... 709/104 |

* cited by examiner

Primary Examiner—Xuan M. Thai
(74) Attorney, Agent, or Firm—Schwegman, Lundberg, Woessner & Kluth, P.A.

(57) ABSTRACT

A distributed shared memory multiprocessor computer system is provided, which has a number of processors and is divided into partitions. Each partition has within it one or more of the processors, and may also have memory or cache and other related hardware. Although each partition works together and communicates with other partitions to share computational load, the partitions each are independently operable and execute an independent copy of the operating system. The partitions comprise additional features to enable removal of a partition from the operating computer system, and to enable insertion of hardware into the operating computer system.

17 Claims, 2 Drawing Sheets

PARTITIONING A DISTRIBUTED SHARED MEMORY MULTIPROCESSOR COMPUTER TO FACILITATE SELECTIVE HARDWARE MAINTENANCE

FIELD OF THE INVENTION

The invention relates generally to multiprocessor computers, and more specifically to multiprocessor system with the capability of shutting down and replacing hardware in a partition while the remainder of computer system remains operational.

INCORPORATION BY REFERENCE

This application hereby incorporates by reference pending patent application Ser. No. 08/971,184, filed on Nov. 17, 1997.

BACKGROUND OF THE INVENTION

Multiprocessor computer systems have long been valued for the high performance they offer by utilizing multiple processors that are not individually capable of the same high level of performance as the multiprocessor system. In such multiprocessor systems tasks are divided among more than one processor, such that each processor does a portion of the computation of the system. Therefore, more than one task can be carried out at a time with each task or thread running on a separate processor, or a single task can be broken up into pieces that can be assigned to each processor. Multiprocessor systems incorporate many methods of dividing tasks among their processors, but all benefit from the ability to do computations on more than one processor simultaneously.

Traditionally, multiprocessor systems were large mainframe or supercomputers with several processors mounted in the same physical unit. Modern multiprocessor systems include arrays of interconnected computers or workstations that divide large tasks among themselves in much the same way as the processors of traditional mainframe systems, and achieve similarly impressive results. Many multiprocessor computer systems have a combination of theses attributes, such as a group of multiprocessor systems that are interconnected.

With multiple processors and multiple computational processes within a multiprocessor system, a mechanism must exist for allowing processors to share access to data and share the results of their computations. Centralized memory systems use a single central bank of memory that all processors can access, such that all processors can access the central memory at roughly the same speed. Still other systems have distributed or independent memory for individual processors or groups of processors and provide faster access to memory that is local to each processor or group of processors, but access to data from other processors takes somewhat longer than in shared memory systems.

The memory, whether centralized or distributed, can further be shared or multiple address type memory. Shared address memory systems allow multiple processors to access the same memory, whether distributed or centralized, to communicate with other processors via data stored in the shared memory. Multiple address memory incorporates separate memory for each processor or group of processors, and does not allow access to this local memory to other processors. Such multiple address or local memory systems must rely on messages to share data between processors.

Cache memory can be utilized in any of these memory configurations to attempt to provide faster access to data each processor is likely to need and to reduce requests for the same commonly used data from multiple processors on the system bus.

Cache in a multiple address system simply caches data from the local memory, but cache in a shared address system typically caches memory from any of the shared memory locations, whether local or remote from the processor requesting the data. The cache associated with each processor or group of processors in a distributed shared memory system likely maintains copies of data from memory local to a number of other processor nodes. Information about each block of memory is kept in a directory, which keeps track of data such as which caches have copies of the block, whether the cache is dirty, and other related data. The directory is used to maintain cache coherency, or to ensure that the system can determine whether the data in each cache is valid. The directory is also used to keep track of which caches hold data that is to be written, and facilitates granting exclusive write access to one processor or I/O device. After write access has been granted and a memory location is updated, the cached copy are marked as dirty.

As described above, processors in parallel processing or multiprocessor systems must communicate with the other processors to share computational data to effectively share tasks or work on the same task, and so must be configured to communicate with the number of processors or processor groups present in the multiprocessor system. Installation of a new processor or removal of an old processor requires reconfiguration of the multiprocessor system so that tasks and information are not communicated to a processor that has been removed or so that a new processor is utilized by the system. Furthermore, changing the number of processors in a system has traditionally required shutting down the entire system and restarting the system after reconfiguration so that the hardware can reset and the software can reboot across the system, and to ensure that the system does not encounter errors due to other software or hardware management problems. Also, removal of cache and management of the remaining cache, along with the loss or insertion of shared memory have posed additional obstacles to inserting or removing processors in an operating system.

What is desired is an architecture and method providing the ability to remove or insert hardware while the remainder of the system remains operational.

SUMMARY OF THE INVENTION

A distributed shared memory multiprocessor computer system is provided, which has a number of processors and is divided into partitions. Each partition has within it one or more of the processors, and may also have memory or cache and other related hardware. Although each partition works together and communicates with other partitions to share computational load, the partitions each are independently operable and execute an independent copy of the operating system. The partitions comprise additional features as described herein, to enable removal of a partition from the operating computer system, and to enable insertion of hardware into the operating computer system.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments maybe utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides a multiprocessor computer system configuration and functionality that enable removal of hardware from the computer system while the computer system is operating. The invention provides the user with increased availability and less intrusive serviceability for the system by allowing removal of a partition with a hardware failure, such that the defective hardware can be removed, fixed or replaced, and be reinserted. The present invention includes modified functionality for various system components such as cache management, reset control, and physical connection that enable removal and insertion of partitions within a running partitioned multiprocessor computer system.

Partitions can be any division of hardware within the multiprocessor system, as long as each partition is capable of running its own copy of the operating system, and can in effect operate as a smaller independent system. Although partitions could be created such that a partition contains a single processor, the purpose of partitioning to enable removal and replacement of hardware dictates that a full node be replaced in the preferred embodiment. Where a node that includes multiple processors is physically located on a single circuit board, the node is the minimum useful partition size. But, larger partitions containing several nodes each can also be useful in that they facilitate more efficient sharing of data within the partition and still provide the ability to shut down and restart a single partition. Removing one of these larger partitions would however require shutting down a greater number of nodes than is physically necessary to replace hardware.

Figure 1:
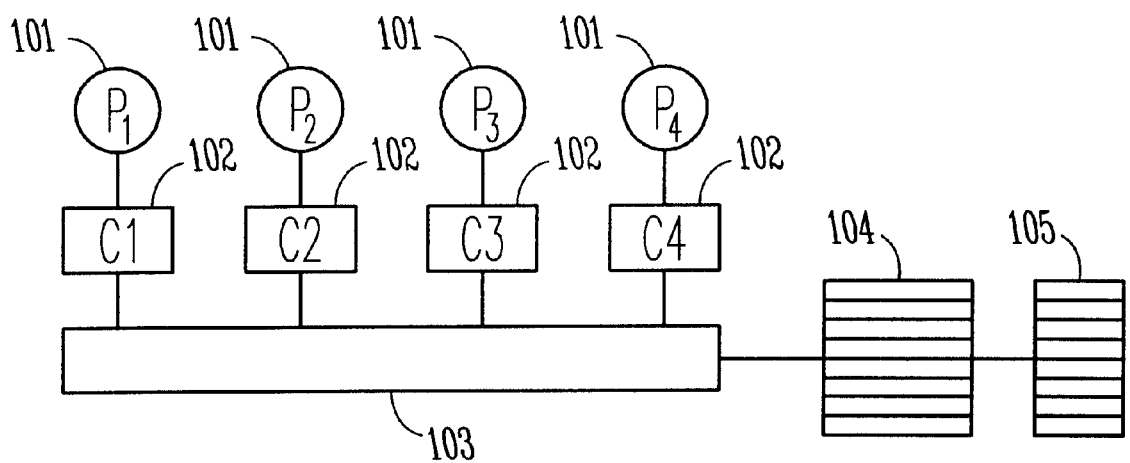
FIG. 1 shows a processor node having four processors and a distributed shared memory system, consistent with an embodiment of the present invention.

FIG. 1 illustrates one example of a processor node, which will be used to explain the operation of several components of a multiprocessor system. The node contains four processors P1 through P4 as are shown at 101, and illustrates cache C1 through C4 associated with each processor. Although four processors are shown here, any number of processors, including only one processor, may be present in any node. The cache also need not be associated with each processor independently, but can also be shared among all or some processors within the node. Controller 103 provides node control logic and regulates access to memory 104 and communicates with cache controllers that comprise a part of cache 102. The memory 104 is associated with directory 105, which maintains directory entries for each cacheable block of memory 104. The controller 103 also in some embodiments manages the data link between the node illustrated in FIG. 1 to other nodes.

In a distributed shared memory system, the memory 104 contains data addressable by any processor, and cacheable by any processor. For each block of memory stored in cache, a directory entry in directory 105 indicates what caches have copies of the data and how the data is shared, so that changes to the data can be properly managed. This configuration is just one example of a node architecture consistent with the present invention, and other configurations are to be considered within the scope of the invention.

Traditional distributed shared memory systems allow multiple copies of data to be stored in various caches throughout the multiprocessor system, so that several processors can have local and relatively fast access to the data. Alternatively, a single cache can be assigned exclusive read access to a data location, meaning the cache contains the only cached copy of the data and can write or modify the data. The changed data is then copied to main memory, and is either invalidated in caches containing old copies of the data or new data is broadcast to all caches containing old copies of the data. Such a cache is said to be coherent, meaning that all reads return the most recent value stored in a memory location and all writes are handled such that the last value written to a memory address is the effective value of the memory address. This cache coherency is established by monitoring and recording in a directory the state of each cache, and ensuring the cached data is properly managed.

In the present invention, the task of cache management must be modified from typical cache management methods to ensure that the loss of cache within a partition does not cause the remainder of the system to lose track of the proper value of memory blocks. For example, if a cache in a local partition is removed and has exclusive read access to data so that it can modify the data and write the modifications to cache, there exists a risk that the cache will be removed before the newly written data will be copied from cache back to memory. Solutions include requiring reconciliation of all outstanding shared memory data before shutting down the partition, or eliminating the risk that the only known valid copy of data will be held in cache. Because the latter solution is less problematic to manage, a preferred embodiment of the present invention prohibits caches from executing exclusive reads to memory outside its partition. Further embodiments include modifying cacheable read functions such that a cached read is in effect a snapshot of memory outside the local partition, but such copies are not maintained across partition boundaries.

When a cache write is executed to a cache block that is a copy of memory in a block in a remote partition, some embodiments of the invention convert the write operation to a non-cached write. This eliminates the chance that data written to cache will be lost before being sent to memory. Also, some embodiments of the invention simply allow only uncached writes in which writes are done directly to memory, bypassing cache. Both methods prevent writing data to cache rather than to memory, and so effectively ensure changed data is not lost in a cache that may be disconnected. The data in both embodiments may however be written to cache simultaneously or after writing the data to memory, because such a method guarantees the value in cache is not the only good copy but simply reflects the updated value stored in memory.

Cacheable reads can result in population of a local cache with data that is a snapshot of data in the memory blocks being read, but in some embodiments of the present invention the snapshot cached blocks are not recorded in the cache directory. The cached blocks in such embodiments are invalidated by cache management processes after use, at a control logic-determined barrier point. The barrier point in such embodiments is the point at which data that has been the subject of such a snapshot caching may again be written or updated. The cache management logic can therefore ensure that the snapshot cached data remains valid and reflects unchanged memory data until the barrier point is reached, at which time the snapshot cached data becomes invalid and must be refreshed or discarded.

Figure 2:
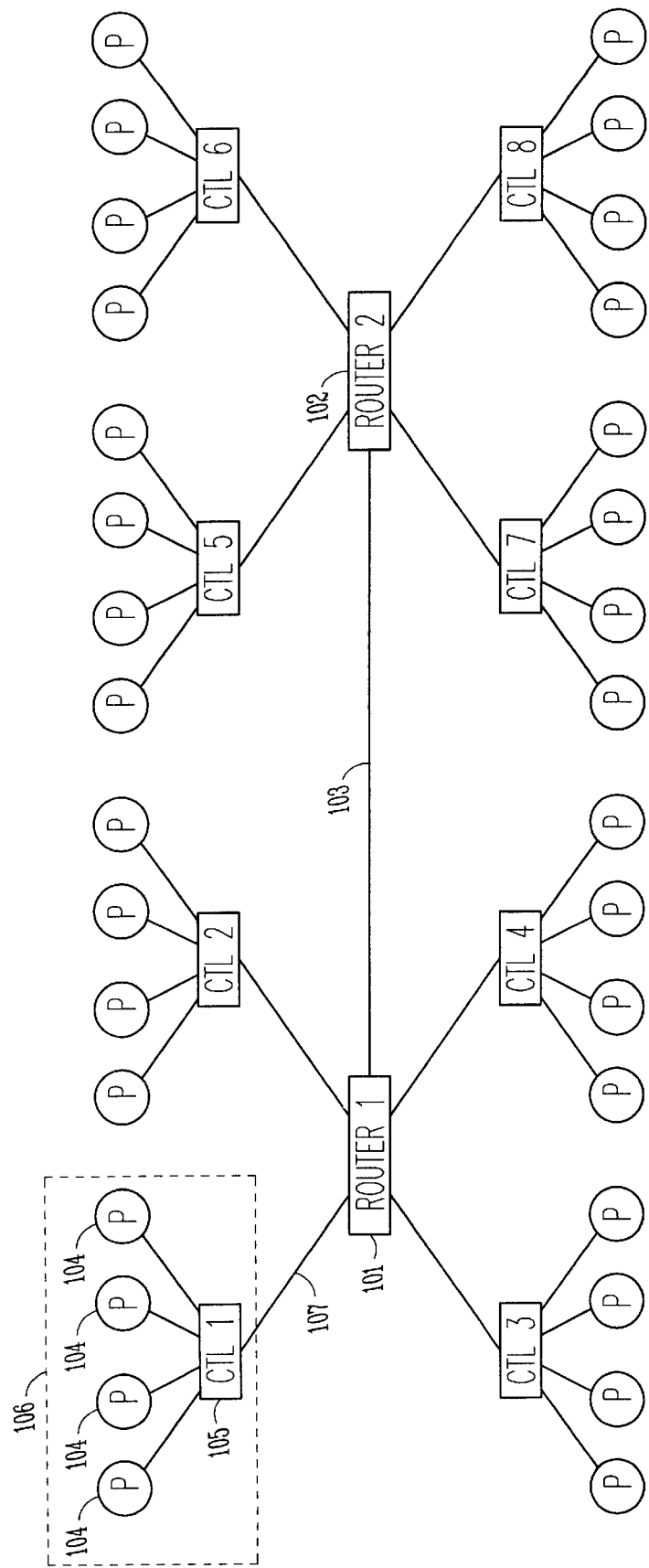
FIG. 2 shows a multi-node multiprocessor computer topology that is partitionable consistent with an embodiment of the present invention.

FIG. 2 illustrates a system configuration of an embodiment of the present invention, to demonstrate how such a system may be partitioned. At the center of the example system are two routers, which link node controllers to each other and link to other routers. Individual processors are shown at 104 and identified by a circled letter "P" in FIG. 2, and are managed in groups of four by controllers 105. Up to four controllers are linked to each router, such as router 1 at 101. The controllers like controller 1 shown at 105 are numbered 1–8, each linking four processors to a router. Router 1 shown at 101 and router 2 shown at 102 are linked by link 103, and so serve to link controllers 1–4 to controllers 5–8.

Other topologies with between nine and sixteen processors require only a single router to link the four or less controllers, and topologies with between eight and five processors require only a direct link between two controllers. Topologies with four or less processors require only a single controller, and are so not partitionable. Finally, topologies with more than 32 processors require a greater number of routers, with some embodiments including multiple connections to each router and routers that serve to link other routers.

A node is shown at 106, which in some embodiments and for purposes of this example is the smallest physically removable piece of hardware in the multiprocessor system. A minimum partition size is therefore a four processor node with a controller, as shown at 106. Smaller partition sizes are implementable consistent with some embodiments of the invention, but would require removing more than one partition each time hardware maintenance was performed, making these smaller partitions impractical. Larger partitions comprising more than one node are also possible, but would require shutting down an entire partition with more hardware than the minimum amount of hardware necessary to repair a single hardware failure.

The process of removing a partition from an operating system in many embodiments requires more special functionality than simply modified cache management. The operating system is also brought down on the partition to be removed via a control module, and hardware is tristated so that it does not lock up or latch invalid data. When the partition is brought up, local resets are constrained to resetting hardware within the partition, and the operating system is restarted on the partition.

Hardware I/O lines that communicate between the partition and other controllers, routers, or other multiprocessor system components are driven with tristate drivers, so that they can be tristated or brought to a neutral state before disconnecting the hardware. For example, connection 107 between the node controller 105 and the router 101 in FIG. 2 is tristated in some such embodiments, so that the connection can be safely electrically broken. Control logic causes the drivers to enter tristate mode during the removal process, and controls other aspects of the partition removal process.

For example, control logic prevents local reset signals from propagating past partition boundaries upon insertion of a new partition into a running computer system. The control logic may be implemented in what is known as a reset fence, which in some embodiments takes the form of a router register that is set on boot of the operating system. Because reset signals normally propagate across all nodes within a system, a special global reset or skeleton key reset is provided in some embodiments to restore the ability to reset a partition from outside the partition. Such functionality allows resetting another partition such as when the other partition becomes locked up and is not capable of resetting itself.

The control logic and other functionality described herein facilitates management of partitions in a partitioned multiprocessor system so that a single partition may be removed from an operating computer system or inserted into an operating computer system. Variations on the control methods and apparatus described herein may achieve similar results, and are to be considered Within the scope of the invention. The present invention provides the ability to service hardware within a partition without requiring shutting down other partitions within a multiprocessor system, thereby increasing computer availability.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

We claim:

1. A distributed shared memory multiprocessor computer system, comprising:

a plurality of processors;

a plurality of partitions, each of which comprises one or more of the plurality of processors, executes an operating system independent of other partitions, and is independently removable from and insertable into the computer system while the computer system remains in operation;

a system interconnection network, linking the plurality of partitions;

a control module, operable to disable hardware before removal from the operating computer system and to enable hardware after insertion into the operating computer system; and a reset fence that prevents partition reset signals from propagating outside the partition.

2. The distributed shared memory multiprocessor computer system of claim 1, wherein the reset fence is implemented as a register within each partition that is set upon booting of an operating system in the partition.

3. The distributed shared memory multiprocessor computer system of claim 1, wherein the processors are selected from the group consisting of MIPS R12000S, MIPS R14000, MIPS R16000, and Intel Merced processors.

4. The distributed shared memory multiprocessor computer system of claim 1, wherein each partition comprises a c-brick which is further comprised of one or more processors.

5. The distributed shared memory multiprocessor computer system of claim 1, wherein the control module is implemented in software.

6. The distributed shared memory multiprocessor computer system of claim 1, wherein the control module is implemented in hardware.

7. A distributed shared memory multiprocessor computer system, comprising:

a plurality of processors;

a plurality of partitions, each of which comprises one or more of the plurality of processors, executes an operating system independent of other partitions, and is independently removable from and insertable into the computer system while the computer system remains in operation, wherein each partition further comprises one or more c-bricks, each c-brick comprising one or more processors, and each partition further comprises one or more routers, such that each router is connected to one or more c-bricks and to at least one other router;

a system interconnection network, linking the plurality of partitions;

a control module, operable to disable hardware before removal from the operating computer system and to enable hardware after insertion into the operating computer system.

8. A distributed shared memory multiprocessor computer system, comprising:

a plurality of processors;

a plurality of partitions, each of which comprises one or more of the plurality of processors, executes an operating system independent of other partitions, and is independently removable from and insertable into the computer system while the computer system remains in operation;

a system interconnection network, linking the plurality of partitions; and a control module operable to disable hardware before removal from the operating computer system and to enable hardware after insertion into the operating computer system, wherein the control module is further operable to tristate connections between the partition and the computer system such that the computer system is logically detached from the partition.

9. A distributed shared memory multiprocessor computer system, comprising:

a plurality of processors;

a plurality of partitions, each of which comprises one or more of the plurality of processors, executes an operating system independent of other partitions, and is independently removable from and insertable into the computer system while the computer system remains in operation;

a system interconnection network, linking the plurality of partitions; and a control module, operable to disable hardware before removal from the operating computer system and to enable hardware after insertion into the operating computer system, wherein the control module is further operable to handle errors generated as a result of removal of hardware.

10. The distributed shared memory multiprocessor computer system of claim 9, wherein the control module consumes requests to hardware that has been removed.

11. A distributed shared memory multiprocessor computer system, comprising:

a plurality of processors;

a plurality of partitions, each of which comprises one or more of the plurality of processors, executes an operating system independent of other partitions, and is independently removable from and insertable into the computer system while the computer system remains in operation;

a system interconnection network, linking the plurality of partitions;

a control module operable to disable hardware before removal from the operating computer system and to enable hardware after insertion into the operating computer system; and a cache, wherein the cache is not coherent with cache in other partitions, so that removal of one cache from an operating computer system will not result in the computer system crashing.

12. The distributed shared memory multiprocessor computer system of claim 11, wherein coherent reads across partition boundaries are prohibited.

13. The distributed shared memory multiprocessor computer system of claim 11, wherein a write operation to a remote memory location is written directly to memory regardless of whether the memory location data is also stored in local cache.

14. A method of replacing hardware in a distributed shared memory multiprocessor computer system, comprising:

removing a partition containing the hardware to be replaced from the operating computer system;

replacing the hardware to be replaced;

rebooting an operating system on the replaced hardware in the removed partition;

inserting the removed partition back into the operating computer system.

15. The method of claim 14, wherein removing a partition comprises tristating electrical connections between the partition and the operating computer system.

16. The method of claim 14, wherein removing a partition comprises logically removing the partition from a computer configuration via a control module.

17. The method of claim 14, further comprising handling errors generated as a result of removal of the partition via a control module until the partition is inserted back into the computer system.

* * * * *